H. FLEMING.
AIR COMPRESSOR.
APPLICATION FILED JULY 17, 1917.
1,262,476.
Patented Apr. 9, 1918.
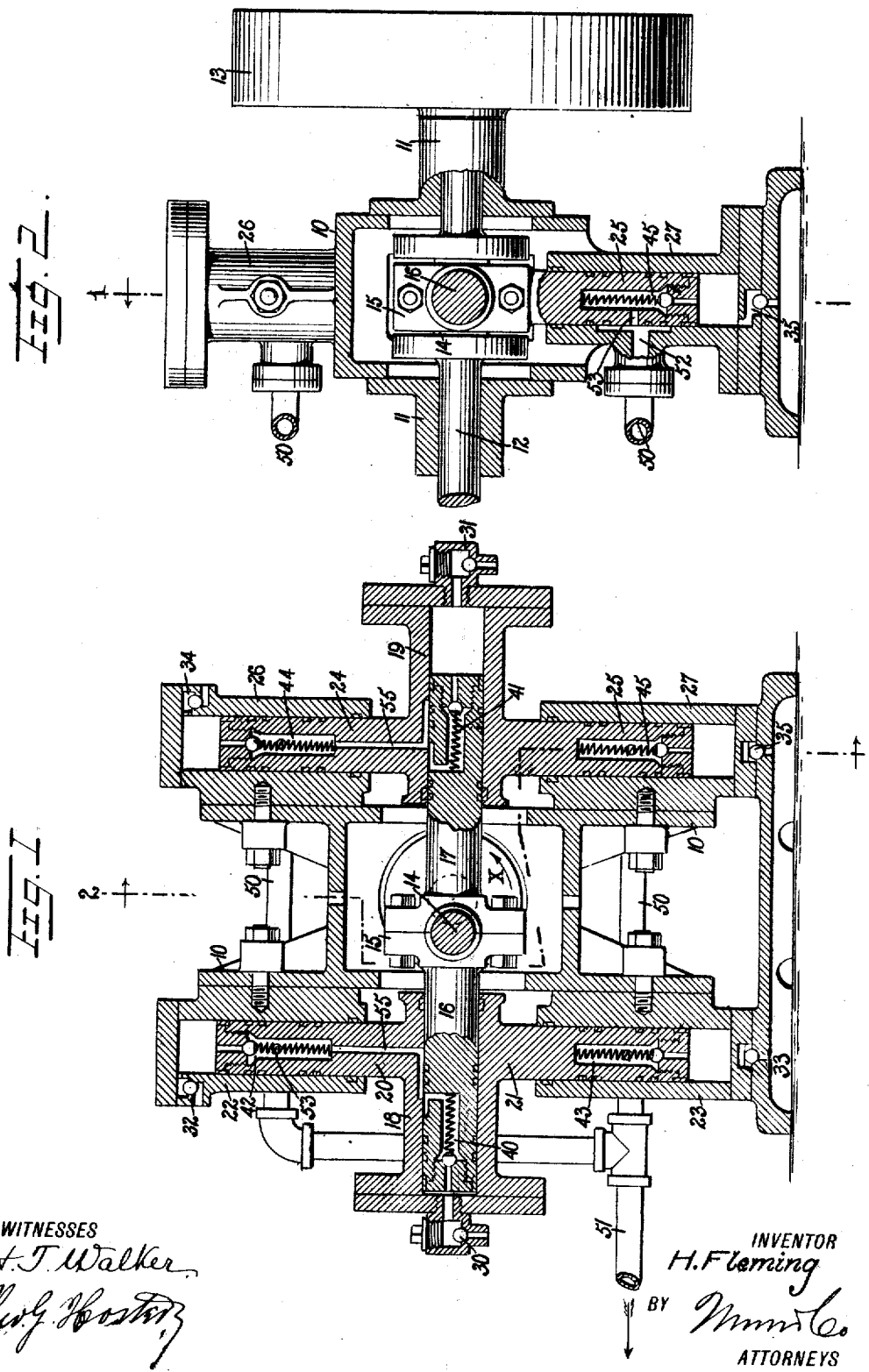
WITNESSES
H. T. Walker
INVENTOR
H. Fleming
BY
ATTORNEYS

UNITED STATES PATENT OFFICE.

HENRY FLEMING, OF BROOKLYN, NEW YORK.

AIR-COMPRESSOR.

1,262,476.

Specification of Letters Patent.

Patented Apr. 9, 1918.

Application filed July 17, 1917. Serial No. 181,044.

*To all whom it may concern:*

Be it known that I, HENRY FLEMING, a citizen of the United States, and a resident of the city of New York, borough of Brooklyn, in the county of Kings and State of New York, have invented a new and Improved Air-Compressor, of which the following is a full, clear, and exact description.

The object of the invention is to provide a new and improved air compressor arranged to insure easy running and delivering a continuous stream of compressed air to a reservoir or other receptacle. Another object is to render the air compressor exceedingly compact in construction and to balance the parts with a view to reduce friction and vibration to a minimum.

In order to accomplish the desired result, use is made of a crank shaft, a plunger connected with the crank of the said crank shaft and receiving a reciprocating motion and a bodily motion at a right angle to the reciprocating motion, a cylinder in which reciprocates the said plunger and which cylinder participates in the bodily motion given to the plunger, a plunger fixed on the said cylinder and extending in the plane of the bodily movement of the cylinder, and a fixed cylinder in which reciprocates the said plunger on the bodily moving cylinder.

A practical embodiment of the invention is represented in the accompanying drawings forming a part of this specification, in which similar characters of reference indicate corresponding parts in both views.

Figure 1 is a longitudinal central section of the air compressor on the line 1—1 of Fig. 2; and Fig. 2 is a cross section of the same on the line 2—2 of Fig. 1.

The improved air compressor is mounted on a suitable support 10 provided with bearings 11 in which is journaled a crank shaft 12 driven from other machinery by the use of suitable connecting devices such as a pulley 13 secured on the shaft 12 and connected by belt with other machinery. The crank or wrist pin 14 of the crank shaft 12 is engaged by a head 15 common to plungers 16 and 17 arranged in axial alinement and extending in opposite directions from the wrist pin 14, as plainly shown in Fig. 1. The plungers 16 and 17 reciprocate in cylinders 18 and 19 which receive a bodily movement in an up and down direction from the plungers 16 and 17. The cylinder 18 is provided with integral or attached plungers 20 and 21 extending vertically and having a common axis, and the said plungers 20 and 21 reciprocate in cylinders 22 and 23 secured to one side of the support 10. The bodily movable cylinder 19 is similarly provided with integral or attached pistons 24, 25 disposed vertically and reciprocating in cylinders 26 and 27 secured to the support 10 at the side opposite to the one on which the cylinders 22 and 23 are mounted. By reference to Fig. 1 it will be noticed that the pairs of cylinders 22, 23, 26, and 27 are arranged on opposite sides of the crank shaft 12. The outer ends of the bodily movable cylinders 18 and 19 are provided with valved inlets 30 and 31, and similar valved inlets 32, 33, 34 and 35 are arranged on the outer ends of the fixed cylinders 22, 23, 26 and 27. The plungers 16, 17, 20, 21, 24 and 25 are provided with valved outlets 40, 41, 42, 43, 44 and 45 connected with the outer ends of their respective cylinders. The fixed cylinders 22, 23, 26 and 27 are provided with discharge pipes 50 connected with one common pipe 51 for delivering the compressed air to a storage reservoir or other receptacle. Each of the outlet pipes 50 is connected with a passage 52 (see Fig. 2) formed in the corresponding cylinder 22, 23, 26 or 27 at all times in register with a port 53 leading to the corresponding valved outlet 42, 43, 44 or 45. The valves of the several valved outlets 42, 43 44 and 45 are spring-pressed and open inwardly during the outward movements of the corresponding plungers 20, 21, 24 and 25 in their cylinders 22, 23, 26 and 27. The valved outlets 40 and 41 of the plungers 16 and 17 register at all times with passages 55 formed in the plungers 20 and 24 and leading to the valved outlets 42 and 44.

The operation is as follows:

When a rotary motion is given to the shaft 12 then the crank 14 thereof imparts a reciprocating motion to the plungers 16 and 17 whereby air is alternately sucked in the outer ends of the cylinders 18 and 19 and discharged through the valved outlets 40, 41, passages 55, valved outlets 42, 44, ports 53 and passages 52, to finally pass by way of the pipes 50 and 51 to a reservoir. The crank 14 not only imparts a reciprocating movement to the plungers 16 and 17 but at the same time moves the latter up and down in a vertical plane whereby a like movement is given to the cylinders 18 and 19 and consequently their pistons 20, 21 and 24, 25 reciprocate in the cylinders 22, 23 and 26, 27. Air is alternately sucked in the ends of the cylinders 22, 23 and 26, 27 by way of the corresponding valved inlets 32, 33 and 34, 35, and air is alternately discharged by way of the valved outlets 42, 43, 44, 45, the ports 53, passages 52 to the pipes 50, 51 which conduct the compressed air to the reservoir. Presuming that the shaft 12 rotates in the direction of the arrow x indicated in Fig. 1, it will be noticed that during a quarter stroke both plungers 16 and 20 draw air simultaneously into the cylinders 18 and 22, and during another quarter stroke they simultaneously compress the air and discharge the same as previously explained. A similar action takes place relative to the plungers 17 and 24 in the cylinders 19 and 26. It will be noticed that by the arrangement described six cylinders are actuated simultaneously from the crank 14 to force a continuous stream of compressed air through the pipe 51 to the reservoir, and it will also be noticed that the action of the various plungers tends to complete the balance of the air compressor to insure easy running thereof.

Although I have shown and described the invention as an air compressor, it is evident that the same can be used as a pump for pumping water or other liquids.

Having thus described my invention, I claim as new and desire to secure by Letters Patent:—

1. In an air compressor or pump, the combination of a driven crank shaft, a plunger connected with the crank of the said crank shaft and receiving from the said crank a reciprocating motion and a bodily motion at a right angle to the reciprocating motion, a cylinder in which reciprocates the said plunger and which cylinder participates in the bodily motion given to the plunger, a plunger fixed on the said cylinder and extending in the plane of the said bodily motion of the cylinder, a fixed cylinder in which reciprocates the said plunger on the bodily moving cylinder, suction valves on the outer ends of the said cylinders, discharge valves mounted in the said pistons and interiorly connected with each other, and an outlet connected with the discharge valve of the piston in the fixed cylinder.

2. In an air compressor or pump, a driven crank shaft, plungers at a right angle to the said crank shaft and having a common head engaging the crank of the said crank shaft, bodily movable cylinders in which reciprocate the said plungers and which move bodily with the said plungers at a right angle relative to the reciprocating motion thereof, cylinder plungers fixed on the said cylinders and extending in the plane of the bodily movement of the cylinders, fixed cylinders in which reciprocate the said plungers fixed on the movable cylinders, suction valves on the outer ends of the said cylinders, spring-pressed valves arranged in the said pistons, internal passages connecting the bodily moving pistons with two of the cylinder pistons, and outlets on the fixed cylinders and in communication with the discharge valves in the pistons reciprocating in the said fixed cylinders.

3. In combination, a crank shaft, plungers at a right angle to the said crank shaft and having a common head engaging the crank of the said crank shaft, bodily movable cylinders in which reciprocate the said plungers and which move bodily with the said plungers at a right angle relative to the reciprocating motion thereof, plungers fixed on the said cylinders and extending in the plane of the bodily movement of the cylinders, fixed cylinders in which reciprocate the said plungers fixed on the movable cylinders, valved inlets on the said cylinders, and valved outlet passages in the said plungers and connected with the inlet ends of the cylinders, discharge pipes attached to the said fixed cylinders and connected with the said outlet passages of the plungers reciprocating in the said fixed cylinders, and a connected passage leading from each outlet passage in a plunger reciprocating in a movable cylinder with the outlet passage of one of the plungers fixed on such movable cylinder.

4. In combination, a crank shaft, plungers at a right angle to the said crank shaft and having a common head engaging the crank of the said crank shaft, bodily movable cylinders in which reciprocate the said plungers and which move bodily with the said plungers at a right angle relative to the reciprocating motion thereof, plungers fixed on the said cylinders and extending in the plane of the bodily movement of the cylinders, fixed cylinders in which reciprocate the said plungers fixed on the movable cylinders, a valved inlet on the outer end of each of the said cylinders, valved passages in each of the said plungers and connected with the outer inlet ends of the said cylinders, outlets leading from the said fixed cylinders, and connecting passages connecting the valved passages of the reciprocating plungers in the bodily movable cylinders with the valved passages of sundry of the plungers fixed on the said movable cylinder and reciprocating in the corresponding fixed cylinders.

HENRY FLEMING.

Copies of this patent may be obtained for five cents each, by addressing the "Commissioner of Patents, Washington, D. C."